US010655053B2

(12) United States Patent
Rizq et al.

(10) Patent No.: US 10,655,053 B2
(45) Date of Patent: May 19, 2020

(54) METHODS AND COMPOSITIONS FOR DIVERSION DURING ENHANCED OIL RECOVERY

(71) Applicant: Saudi Arabian Oil Company, Dhahran (SA)

(72) Inventors: Ahmad Noor Al-deen Rizq, Dhahran (SA); Badr H. Zahrani, Dana (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/406,203

(22) Filed: May 8, 2019

(65) Prior Publication Data

US 2019/0264090 A1 Aug. 29, 2019

Related U.S. Application Data

(62) Division of application No. 15/897,474, filed on Feb. 15, 2018.

(51) Int. Cl.
  *C09K 8/58* (2006.01)
  *E21B 33/138* (2006.01)
  *C09K 8/506* (2006.01)
  *E21B 43/16* (2006.01)

(52) U.S. Cl.
  CPC ............... *C09K 8/58* (2013.01); *C09K 8/506* (2013.01); *E21B 33/138* (2013.01); *E21B 43/16* (2013.01)

(58) Field of Classification Search
  None
  See application file for complete search history.

(56) References Cited

U.S. PATENT DOCUMENTS

| 2,223,789 | A | * | 12/1940 | Limburg | ................ | E02D 19/16 |
| | | | | | | 166/294 |
| 2,356,205 | A | | 8/1944 | Blair, Jr. et al. | | |
| 2,854,396 | A | | 9/1958 | Hunt et al. | | |
| 2,970,958 | A | | 2/1961 | Shapiro | | |
| 3,032,499 | A | * | 5/1962 | Brown | ................... | C09K 8/565 |
| | | | | | | 507/237 |

(Continued)

FOREIGN PATENT DOCUMENTS

| CA | 2250648 C | 4/2000 |
| CA | 2594626 A1 | 1/2009 |

(Continued)

OTHER PUBLICATIONS

Oilfield Review, "Asphaltenes—Problematic but Rich in Potential", Summer 2007.

(Continued)

*Primary Examiner* — Angela M DiTrani Leff
(74) *Attorney, Agent, or Firm* — Dinsmore & Shohl

(57) ABSTRACT

A method for isolating a first region and a proximate second region of a subterranean formation is disclosed that includes introducing an asphaltene composition into the first region of the subterranean formation, the asphaltene composition including asphaltene dissolved in a solvent, and after introducing the asphaltene composition, introducing an aqueous composition to the first region to precipitate the asphaltene in the first region. The precipitated asphaltene forms a barrier that isolates the second region from at least a portion of the first region.

15 Claims, 5 Drawing Sheets

(56) References Cited

U.S. PATENT DOCUMENTS

| | | | |
|---|---|---|---|
| 3,084,744 A * | 4/1963 | Dew | C09K 8/58 166/294 |
| 3,251,414 A * | 5/1966 | Willman | C09K 8/516 166/269 |
| 3,402,770 A | 9/1968 | Messenger | |
| 4,494,605 A | 1/1985 | Wiechel et al. | |
| 4,865,741 A * | 9/1989 | Nolte | B01D 15/422 210/635 |
| 6,186,232 B1 | 2/2001 | Isaacs et al. | |
| 6,367,548 B1 | 4/2002 | Purvis et al. | |
| 9,074,125 B1 | 7/2015 | Lahalih | |
| 9,322,260 B2 | 4/2016 | Potapenko et al. | |
| 9,671,384 B2 | 6/2017 | Rogel et al. | |
| 2011/0066441 A1* | 3/2011 | Ovalles | C10G 75/00 705/1.1 |
| 2012/0255886 A1 | 10/2012 | Flores Oropeza et al. | |
| 2014/0000886 A1 | 1/2014 | Milam et al. | |
| 2014/0318793 A1 | 10/2014 | van Petergem et al. | |
| 2016/0145487 A1* | 5/2016 | Alam | C09K 8/524 507/209 |
| 2016/0200963 A1 | 7/2016 | Reed et al. | |
| 2017/0166798 A1 | 6/2017 | Okamoto et al. | |
| 2019/0093451 A1 | 3/2019 | Al-Nakhli et al. | |

FOREIGN PATENT DOCUMENTS

| | | |
|---|---|---|
| CA | 2856460 A1 | 1/2016 |
| WO | 2005094552 A2 | 10/2005 |
| WO | 2014172711 A1 | 10/2014 |

OTHER PUBLICATIONS

Muggeridge et al., "Recovery rates, enhanced oil recovery and technological limits", Royal Society Publishing, Phil. Trans. R. Soc. A 372, Mar. 20, 2012.

International Search Report and Written Opinion dated Jun. 3, 2019 pertaining to International application No. PCT/US2019/016834 filed Feb. 6, 2019, 14 pgs.

U.S. Office Action dated Jun. 27, 2019 pertaining to U.S. Appl. No. 15/897,474, filed Feb. 15, 2018, 28 pgs.

Office Action dated Nov. 12, 2019 pertaining to U.S. Appl. No. 15/897,474, filed Feb. 15, 2018, 16 pgs.

* cited by examiner

METHODS AND COMPOSITIONS FOR DIVERSION DURING ENHANCED OIL RECOVERY

CROSS-REFERENCE TO RELATED APPLICATION

This application is a divisional application of U.S. patent application Ser. No. 15/897,474 filed Feb. 15, 2018, the entire disclosure of which is hereby incorporated herein by reference.

TECHNICAL FIELD

The present disclosure relates to natural resource well drilling and hydrocarbon production and, more specifically, to methods and compositions for diversion during enhanced oil recovery treatments.

BACKGROUND

The discovery and extraction of hydrocarbons, such as oil or natural gas, from subterranean formations, may be impeded for a variety of reasons, such as inherently poor permeability or damage to the formation. The production rate of hydrocarbons from a hydrocarbon-producing region of the formation may be reduced compared to the expected production rate. In these instances, methods for obtaining enhanced oil recovery from the hydrocarbon-producing regions of the formation can be utilized to improve hydrocarbon production. Enhanced Oil Recovery (EOR) methods may include chemical flooding of the formation using alkaline or micellar-polymer, miscible displacement of the hydrocarbons left in pore space using carbon dioxide injection or hydrocarbon injection, and thermal recovery using steamflood or in-situ combustion. The optimal application of each type depends on formation temperature, pressure, depth, net pay, permeability, residual oil and water saturations, porosity, and fluid properties of the oil, such as specific gravity and viscosity. However, in some cases, treatment materials used in EOR methods may flow out of the hydrocarbon-producing region in which the EOR treatment is being conducted and into other regions of the formation. Flow of treatment materials into other regions of the formation can result in loss of treatment materials and an increase in the quantity of treatment materials required to conduct the EOR treatment.

SUMMARY

A continuing need exists for methods and compositions for producing barriers for diverting treatment materials during EOR treatments. The present disclosure is directed to compositions and methods for diverting treatment materials used in EOR treatment methods into target regions of the formation and restricting the flow of these treatment materials to other regions of the formation.

In accordance with one or more embodiments of the present disclosure, a method for isolating a first region and a proximate second region of a subterranean formation is disclosed. The method includes introducing an asphaltene composition into the first region of the subterranean formation, the asphaltene composition including asphaltene dissolved in a solvent. After introducing the asphaltene composition, the method includes introducing an aqueous composition to the first region to precipitate the asphaltene in the first region, where the precipitated asphaltene forms a barrier that isolates the second region from at least a portion of the first region.

In accordance with other embodiments of the present disclosure, a composition for a subterranean barrier is disclosed. This composition includes asphaltene dissolved in a solvent that includes at least one alkyl alcohol, at least one alkyl aromatic, and at least one halogenated hydrocarbon.

Additional features and advantages of the described embodiments will be set forth in the detailed description which follows. The additional features and advantages of the described embodiments will be, in part, readily apparent to those skilled in the art from that description or recognized by practicing the described embodiments, including the detailed description which follows as well as the drawings and the claims.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
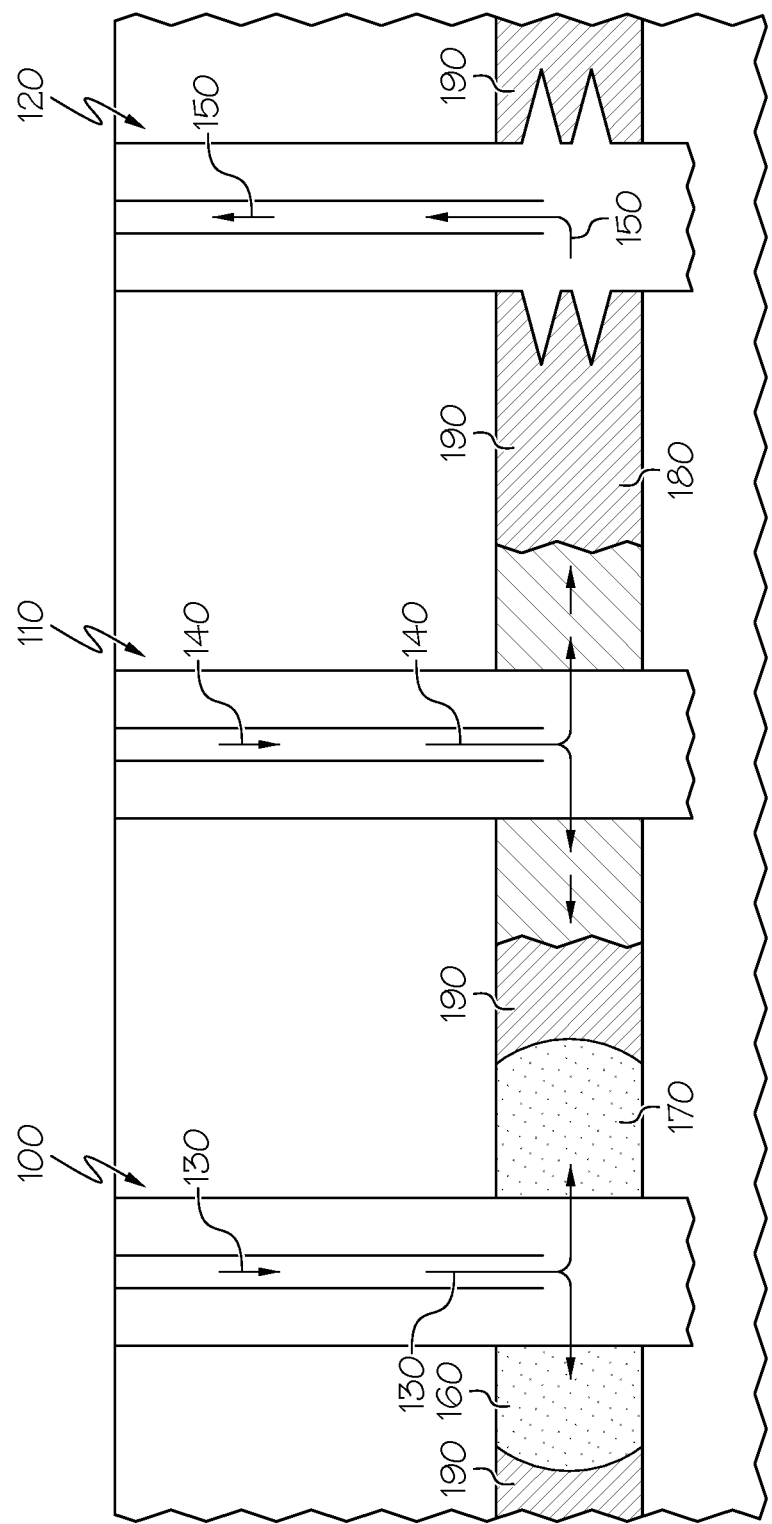
FIG. 1 schematically depicts a formation of a barrier for diversion of treatment materials in a subterranean formation, according to one or more embodiments described in this disclosure.

Recitations in the present disclosure of "at least one" component, element, constituent, compound, or other feature, should not be used to create an inference that the alternative use of the articles "a" or "an" should be limited to a single component, element, constituent, compound, or feature. For example, "an alkyl alcohol" may refer to one alkyl alcohol or more than one alkyl alcohol.

A formation is the fundamental unit of lithostratigraphy. As used in the present disclosure, the term "formation" refers to a body of rock that is sufficiently distinctive and continuous from the surrounding rock bodies that the body of rock can be mapped as a distinct entity. A formation is, therefore, sufficiently homogenous to form a single identifiable unit containing similar rheological properties throughout the formation, including, but not limited to, porosity and permeability. A single formation may include different regions, where some regions include hydrocarbons and others do not. To produce hydrocarbons from the hydrocarbon regions of the formation, production wells are drilled to a depth that enables these hydrocarbons to travel from the subterranean formation to the surface. This initial stage of production is referred to as "primary recovery."

In primary recovery, natural formation energy, such as gasdrive, waterdrive, or gravity drainage, displaces hydrocarbons from the formation into the wellbore and up to the surface. Initially, the formation pressure may be considerably greater than the downhole pressure inside the wellbore. This differential pressure may drive hydrocarbons toward the wellbore and up to surface. However, as the formation pressure decreases because of hydrocarbon production, the differential pressure also decreases. To reduce the downhole pressure, or to increase the differential pressure to increase hydrocarbon production, an artificial lift system may be implemented, such as a rod pump, an electrical submersible pump, or a gas-lift installation. Production using artificial lift is considered primary recovery. The primary recovery stage reaches its limit when the formation pressure is reduced to the point that the hydrocarbon production rates are no longer economical or when the proportions of gas or water in the production stream increase to the point that further primary recovery is no longer economical. During primary recovery, only a minority percentage of the initial hydrocarbons in the formation are extracted (typically around 10 percent (%) by volume for hydrocarbon formations).

During a second recovery stage of hydrocarbon production, an external fluid such as water or gas may be injected into the formation through injection wells positioned in rock that is in fluid communication with production wells. As used in this disclosure, the term "injection well" refers to a well in which fluids are injected into the formation rather than produced. The purpose of secondary recovery is to maintain formation pressure and to displace hydrocarbons toward the wellbore. The secondary recovery stage reaches its limit when the injected fluid (water or gas) is produced in considerable amounts from the production wells and the production is no longer economical. The successive use of primary recovery and secondary recovery in a hydrocarbon formation produces, on average, 15% to 40% by volume of the original hydrocarbons in place. This indicates that a significant amount of hydrocarbons remains in the formation after primary and secondary recovery. EOR techniques can be used during, or after, primary or secondary recovery to increase the hydrocarbon yield from the formation. Injection wells are typically used for the primary objective of maintaining formation pressure through secondary recovery. However, injection wells may also be used in EOR treatments to inject treatment materials, diversion materials, or both.

At any time during production, EOR techniques may be used to improve hydrocarbon displacement in the formation and increase fluid flow from the formation to the production well. "EOR" refers to various supplementary recovery techniques utilized for the purpose of increasing the hydrocarbon yield of a formation. As described previously in this disclosure, EOR treatments may use various physical and chemical techniques to alter the original properties of the hydrocarbons. EOR may improve hydrocarbon displacement in the formation and increase fluid flow from the formation to the production well. In some embodiments, EOR may include injecting treatment materials into the formation to displace hydrocarbons in the hydrocarbon-producing region. However, these treatment materials may flow into other regions of the formation that may not be hydrocarbon-producing regions, which may result in loss of treatment materials. This loss of treatment materials may further result in an increase in the quantity of the treatment materials required to conduct the EOR treatments.

Loss of treatment materials during EOR may be reduced by using a means of diversion. As used in this disclosure, the term "diversion" refers to a process of forming a barrier in the formation to at least partially isolate a region of the formation from other regions of the formation. For example, in some embodiments, a barrier may be formed in the formation to isolate a region undergoing EOR from the other regions of the formation and to prevent or reduce the flow of treatment materials from the region undergoing EOR to other regions of the formation. Producing a barrier in the formation may enable treatment materials to be focused on the hydrocarbon-producing regions undergoing EOR treatment and may reduce loss of treatment materials to other regions of the formation. In some embodiments, the barrier formed during diversion may be temporary. This may enable a well to produce from that region when the EOR treatment is complete.

There are two main categories of diversion: chemical diversion and mechanical diversion. Chemical diversion includes the use of a chemical agent to achieve diversion during EOR. Some examples of conventional diversion materials may include, but are not limited to, benzoic acid, oil-soluble resins, rock salt, gels, foams, cements, or combinations of these. Some conventional diversion materials, including gels and foams, have a limited time frame for use. Gels, foams, and cement have a limited time frame during which they may be pumped into the formation, relating to the set time and the cure time it takes for the gel, foam, or cement to transform into a solid which can no longer be pumped into the formation. There is also a limited time frame for which gels and foams form an effective barrier in the formation before breakdown occurs. Additionally, the greater viscosities of conventional gels, foams, and cements, compared to the compositions of the present disclosure, may limit the distance into the formation that these conventional diversion materials can be injected. Further, the amount of solids present in some diversion materials, such as cement compositions for example, makes injection of these diversion materials into formations having small pore volumes difficult or impossible. Furthermore, the costs associated with these conventional diversion materials may be prohibitive, especially when the diversion materials are purchased and used in large quantities, as is typical.

The present disclosure is directed to methods for performing diversion during EOR, in particular to methods for isolating a first region and a proximate second region of a subterranean formation. The methods may include introducing an asphaltene composition into the first region of the subterranean formation. The asphaltene composition may include asphaltene dissolved in a solvent. The asphaltene dissolves in the solvent to produce a fluid solution having a viscosity that enables the asphaltene composition to be injected into the formation, even formations with small pore volumes. The methods may further include, after introducing the asphaltene composition, introducing an aqueous composition to the first region in order to precipitate the asphaltene in the first region. As described subsequently in this disclosure, the asphaltene is less soluble in the aqueous composition compared to solubility in the solvent, which causes the asphaltene to precipitate out of the liquid to form a solid precipitate within the formation. The precipitated asphaltene may form a barrier that isolates or separates the second region from at least a portion of the first region.

Referring now to FIG. 1, an example installation for conducting EOR is illustrated. As shown in FIG. 1, the installation may include a diverter injection well 100, an EOR injection well 110, and a production well 120, all of which may be in fluid communication with a subterranean formation 190. As shown in FIG. 1, the subterranean formation 190 includes a first region 160 and a proximate second region 180. The barrier 170 formed by precipitation of the asphaltene in the first region 160, according to the methods of the present disclosure, may isolate at least a portion of the proximate second region 180 from the first region 160. Although the barrier 170 is depicted in FIG. 1 as impeding horizontal flow between the proximate second region 180 and the first region 160, the method and compositions described in this disclosure may also be used to impede multidirectional flow, such as vertical flow or combinations of vertical and horizontal flow, for example.

Among other benefits, the asphaltene composition does not have a limited time frame for use. The asphaltene composition does not have a set time or cure time limiting the time available to pump the asphaltene composition into the formation, which may enable the asphaltene composition to be pumped longer and therefore travel farther into the formation. Furthermore, the asphaltene precipitates out of solution when the aqueous composition is introduced into the formation and remains in place as a barrier until the solvent is introduced into the formation again and the asphaltene dissolves back into solution. Therefore, time is not a limiting factor, and the asphaltene will function as a barrier for as long as necessary. The asphaltene composition also has a lesser viscosity than conventional diversion materials, which enables the asphaltene to travel a farther distance into the formation during injection compared to the conventional diversion materials. Asphaltene may be a material recovered as a by-product of hydrocarbon processing. For example, the asphaltene may precipitate out of the hydrocarbon streams as the result of pressure drop, turbulent flow, solution carbon dioxide, injected condensate, mixing of incompatible crude oils, or other conditions or materials that break the stability of the asphaltene in the hydrocarbon stream during hydrocarbon processing. Utilizing asphaltene as a diversion material in EOR may provide a beneficial use for a by-product recovered from hydrocarbon processing, which may result in recycling and conserving valuable resources. Asphaltene is a readily available material in hydrocarbon processing. Therefore, utilizing the asphaltene for diversion materials during EOR may reduce costs for producing diversion barriers compared to conventional diversion materials. Other benefits may be realized by the methods and compositions described in this disclosure.

As previously discussed in this disclosure, the asphaltene composition includes asphaltene dissolved in a solvent. Asphaltene is an organic material that includes aromatic and naphthenic ring compounds and may contain nitrogen, sulfur, and oxygen compounds or functional groups. The asphaltene fraction of crude oil is not soluble in straight-chain hydrocarbon solvents such as pentane or heptane. Asphaltenes are present in carbonaceous materials such as crude oil and may be recovered from hydrocarbon processing operations as a byproduct or removed from the crude oil or intermediate hydrocarbon streams upstream of hydrocarbon processing operations. Asphaltene includes the portion of a carbonaceous material that is not soluble in n-heptane but is soluble in toluene. Asphaltenes may be present in other carbonaceous materials, such as coal or bitumen, for example. Asphaltenes may include carbon, hydrogen, nitrogen, oxygen, and sulfur, as well as trace amounts of vanadium and nickel. In some embodiments, the asphaltenes may have a molar ratio of carbon to hydrogen of from 1:1 to 1:1.4, such as from 1:1.1 to 1:1.3, depending on the asphaltene source. In some embodiments, the asphaltenes may have a molecular mass of from 400 daltons (u) to 1500 u.

Asphaltene can be operationally defined as hydrocarbon compounds that are insoluble in n-heptane and soluble in toluene. Asphaltene is non-soluble in water and other aqueous compositions and will remain in solid form when combined with water and other aqueous compositions. The non-solubility of asphaltene in water or other aqueous compositions means that even at increased temperature, the amount of asphaltene dissolved in the water or other aqueous composition is less than 0.01 weight percent (wt. %). However, asphaltenes are soluble in light aromatic solvents such as benzene and toluene and other light organic solvents, such as organic alcohols and halogenated hydrocarbons, for example. As previously discussed in this disclosure, the asphaltene composition includes asphaltene dissolved in a solvent. The dissolved asphaltene may be precipitated out of the solvent solution by introducing an aqueous solution to the asphaltene composition. As the aqueous solution gradually dilutes the solvent, the solubility of the asphaltene in the solvent is reduced, which causes precipitation of the asphaltene out of solution to form a solid precipitate. This is evidenced by the viscosity data presented in FIG. 2 and discussed subsequently in this disclosure in Example 1. It was found that the difference in solubility of the asphaltene in the solvent compared to the solubility of asphaltene in water can be used to form a barrier for diversion in the context of EOR. For example, the greater solubility of the asphaltene in the solvent may enable the asphaltene composition to be injected deep into the formation, even if the formation includes small pore sizes. Then, once the asphaltene composition is in position in the formation, water or other aqueous composition can be injected to mix with the asphaltene composition in the formation. Because asphaltene is non-soluble in water and other aqueous compositions, increasing the concentration of water relative to the concentration of the solvent causes the asphaltene to precipitate in place within the formation to form the barrier. Utilizing this method in the context of EOR diversion enables the solid asphaltene to form the barrier in the formation, which may be used as a diversion in EOR treatments.

The solvent may be an organic solvent. In some embodiments, the solvent may include one or more than one of an alkyl alcohol, an alkyl aromatic, a halogenated hydrocarbon, or combinations of these. The alkyl alcohol may be a straight-chain, branched, or cyclic alkyl alcohol having from 1 to 20 carbon atoms, such as from 1 to 15, from 1 to 12, or from 1 to 10 carbon atoms. The alkyl alcohol may be a saturated alkyl alcohol or an unsaturated alkyl alcohol. The alkyl alcohol may have one or more than one hydroxyl group, such as 1, 2, 3, 4, or more than 4 hydroxyl groups. Examples of alkyl alcohols may include, but are not limited to methanol, ethanol, propanol, isopropanol, butanol, hexanol, heptanol, octanol, or combinations of these. Other organic alcohols may also be suitable for use in the solvent. In some embodiments, the solvent may include a plurality of alkyl alcohols. In some embodiments, the solvent may include from 5 wt. % to 50 wt. % alkyl alcohol based on the total weight of the solvent, such as from 5 wt. % to 45 wt. %, from 5 wt. % to 40 wt. %, from 5 wt. % to 35 wt. %, from 5 wt. % to 30 wt. %, from 10 wt. % to 50 wt. %, from 10 wt. % to 45 wt. %, from 10 wt. % to 40 wt. %, from 10 wt. % to 35 wt. %, or from 10 wt. % to 30 wt. % alkyl alcohol. In some embodiments, the alkyl alcohol may be methanol.

In some embodiments, the solvent may include from 5 wt. % to 50 wt. % methanol based on the total weight of the solvent.

The alkyl aromatic may include one or a plurality of aromatic rings and one or a plurality of alkyl groups. The alkyl groups may be straight or branched and may be saturated or unsaturated. The alkyl may have from 1 to 20 carbon atoms, such as from 1 to 15, from 1 to 12, or from 1 to 10 carbon atoms. In some embodiments, the solvent may include a plurality of alkyl aromatics. Alkyl aromatics may include, but are not limited to, toluene, ethylbenzene, p-xylene, m-xylene, o-xylene, mesitylene, durene, 2-phenylhexane, hexamethylbenzene, other alkyl aromatics, or combinations of these. In some embodiments, the solvent may include from 5 wt. % to 50 wt. % alkyl aromatic based on the total weight of the solvent, such as from 5 wt. % to 45 wt. %, from 5 wt. % to 40 wt. %, from 5 wt. % to 35 wt. %, from 5 wt. % to 30 wt. %, from 10 wt. % to 50 wt. %, from 10 wt. % to 45 wt. %, from 10 wt. % to 40 wt. %, from 10 wt. % to 35 wt. %, or from 10 wt. % to 30 wt. % alkyl aromatic. In some embodiments, the alkyl aromatic may be toluene, xylene, or both. As used in this disclosure, the term "xylene" refers to a composition consisting of p-xylene, o-xylene, m-xylene, or any combinations of these. In some embodiments, the solvent may include from 5 wt. % to 50 wt. % toluene and 5 wt. % to 50 wt. % xylene based on the total weight of the solvent.

The halogenated hydrocarbon may be a straight, branched, or cyclic halogenated hydrocarbon having from 1 to 20 carbon atoms and at least one halogen atom covalently bonded to at least one of the carbon atoms. The halogenated hydrocarbon may also be saturated, unsaturated, or aromatic. Halogens include any of the elements in group 17 of the IUPAC periodic table, which includes fluorine (F), chlorine (Cl), bromine (Br), and iodine (I). In some embodiments, the halogenated hydrocarbon may be an alkyl halide. Halogenated hydrocarbons may include, but are not limited to, chloroform, benzotrichloride, bromoform, bromomethane, carbon tetrachloride, chlorobenzene, chlorofluorocarbon, chloromethane, 1,1-dichloro-1-fluoroethane, 1,2-dichlorobenzene, 1,1-dichloroethane, 1,2-dichloroethane, 1,1-dichloroethene, 1,2-dichloroethene, dichloromethane, 1,2-difluorobenzene, 1,2-diiodoethylene, diiodomethane, fc-75, hexachlorobutadiene, hexafluoro-2-propanol, parachlorobenzotrifluoride, perfluoro-1,3-dimethylcyclohexane, perfluorocyclohexane, perfluorodecalin, perfluorohexane, perfluoromethylcyclohexane, perfluoromethyldecalin, perfluorooctane, perfluorotoluene, perfluorotripentylamine, tetrabromomethane, 1,1,1,2-tetrachloroethane, 1,1,2,2-tetrachloroethane, tetrachloroethylene, 1,2,4-trichlorobenzene, 1,1,1-trichloroethane, 1,1,2-trichloroethane, trichloroethylene, 1,2,3-trichloropropane, 1,1,1-trifluoro-2-chloroethane, 2,2,2-trifluoroethanol, trifluorotoluene, trihalomethane, or combinations of these. In some embodiments, the solvent may include from 40 wt. % to 85 wt. % halogenated hydrocarbon based on the total weight of the solvent, such as from 40 wt. % to 80 wt. %, from 40 wt. % to 75 wt. %, from 40 wt. % to 70 wt. %, from 40 wt. % to 65 wt. %, from 45 wt. % to 85 wt. %, from 45 wt. % to 80 wt. %, from 45 wt. % to 75 wt. %, from 45 wt. % to 70 wt. %, or from 45 wt. % to 65 wt. % alkyl aromatic. In some embodiments, the halogenated hydrocarbon may be chloroform. In some embodiments, the solvent may include from 40 wt. % to 85 wt. % chloroform based on the total weight of the solvent.

In some embodiments, the solvent may include at least one alkyl alcohol, at least one alkyl aromatic, and at least one halogenated hydrocarbon. In some embodiments, the solvent may consist of or consist essentially of at least one alkyl alcohol, at least one alkyl aromatic, and at least one halogenated hydrocarbon. In some embodiments, the solvent may include at least one of methanol, toluene, xylene, chloroform, or combinations of these. In some embodiments, the solvent may include methanol, toluene, xylene, and chloroform. In some embodiments, the solvent may consist of or consist essentially of methanol, toluene, xylene, and chloroform. For example, in some embodiments, the solvent may include from 5 wt. % to 50 wt. % methanol, from 5 wt. % to 50 wt. % toluene, from 5 wt. % to 50 wt. % xylene, and from 40 wt. % to 85 wt. % chloroform. In some embodiments, the solvent may consist of or consist essentially of from 5 wt. % to 50 wt. % methanol, from 5 wt. % to 50 wt. % toluene, from 5 wt. % to 50 wt. % xylene, and from 40 wt. % to 85 wt. % chloroform. In some embodiments, the solvent may include 15 wt. % methanol, 10 wt. % xylene, 10 wt. % toluene, and 65 wt. % chloroform based on a total weight of the solvent. Asphaltene is soluble in a solvent including methanol, toluene, xylene, and chloroform, and therefore, when the asphaltene and the solvent are combined to form the asphaltene composition, the asphaltene composition is in a liquid phase.

The asphaltene composition may include a weight ratio of solvent to asphaltene that results in the asphaltene dissolving in the solvent to the extent that the asphaltene composition is substantially free of dissolved solids prior to introducing the asphaltene composition to the first region. As used in this disclosure, the term "substantially free of dissolved solids" refers to the asphaltene composition having less than 1.0 percent by weight undissolved solids. In some embodiments, the asphaltene composition may have a weight ratio of solvent to asphaltene that results in the asphaltene composition having a viscosity in a range of from 1 centipoise (cP) to 3500 cP (1 millipascal second (mPa·s) to 3500 mPa·s; where 1 cP=1 mPa·s). In some embodiments, the asphaltene composition may have a weight ratio of solvent to asphaltene of from 5:1 to 20:1. For example, in some embodiments, the asphaltene composition may have a weight ratio of solvent to asphaltene of from 5:1 to 18:1, from 5:1 to 15:1, from 5:1 to 12:1, from 7:1 to 20:1, from 7:1 to 18:1, from 7:1 to 15:1, from 7:1 to 12:1. In some embodiments, the asphaltene composition may have a weight ratio of solvent to asphaltene of 10:1. In some embodiments, the asphaltene composition includes 50 grams (g) asphaltene for every 1000 milliliter (ml) of the solvent.

The asphaltene composition may have a viscosity that enables the asphaltene composition to be injected a farther distance into the formation compared to conventional diversion materials. In some embodiments, the asphaltene composition may have a viscosity of from 1 cP to 3500 cP (1 mPa·s to 3500 mPa·s). For example, in some embodiments, the asphaltene may have a viscosity of from 1 cP to 3200 cP, from 1 cP to 3000 cP, from 1 cP to 2500 cP, from 5 cP to 3500 cP, from 5 cP to 3200 cP, from 5 cP to 3000 cP, from 5 cP to 2500 cP, from 10 cP to 3500 cP, from 10 cP to 3200 cP, from 10 cP to 3000 cP, from 10 cP to 2500 cP, from 100 cP to 3500 cP, from 100 cP to 3200 cP, from 100 cP to 3000 cP, or from 100 cP to 2500 cP. In some embodiments, the viscosity of the asphaltene composition at 25° C. may be from 2720 mPa·s at a shear rate of 0.0999 inverse seconds ($s^{-1}$) to 587 mPa·s at a shear rate of 1000 $s^{-1}$. Not intending to be limited by theory, it is believed that the viscosity of the asphaltene composition may enable the asphaltene composition to be injected farther into the subterranean formation compared to conventional diversion methods that may result in the barrier being positioned a farther distance into the subterranean formation compared to barrier formed from other conventional diversion materials having greater viscosities.

The asphaltene composition may be a stable solution, meaning that the asphaltene composition has a stable chemical makeup, in which the asphaltene remains dissolved in solution, at a pressure of up to 4000 pounds per square inch (psi) and a temperature of up to 200 degrees Celsius (° C.). The precipitated asphaltene may be stable at pressures of up to 5000 psi and temperatures of up to 400° C., meaning that the precipitated asphaltene solid has a stable chemical makeup under these conditions.

Referring again to FIG. 1, in some embodiments, the asphaltene composition may be introduced into the first region 160 through a diverter injection well 100. The first region may be a barrier region between the second region and other regions of the formation, and the second region may be a hydrocarbon-producing region. The diverter injection well 100 may be located such that the asphaltene composition may be injected into the first region 160 to form the barrier 170 between the first region 160 and the second region 180. It is contemplated that more than one barrier 170 may be formed. For example, the second region 180 may be isolated from two or more regions of a formation by two or more barriers 170. Likewise, it is contemplated that to form these two or more barriers 170, two or more diverter injection wells 100 may be used. In some embodiments, the second region 180 may be proximate to the first region 160. The second region 180 may include an EOR injection well 110 and a production well 120 for introducing treatment materials for EOR and producing hydrocarbons, respectively. It is contemplated that there may be two or more EOR injection wells 110. It is also contemplated that there may be two or more production wells 120 within the second region 180. The EOR injection well 110 and the production well 120 may also be located in other, separate regions of the formation. In some embodiments, the asphaltene composition may be introduced into the first region 160 using coiled tubing or a drill string. In another embodiment, the inlet pressure of the asphaltene composition during introduction of the asphaltene composition to the first region 160 may be from 2000 to 4000 psi. The inlet pressure may be greater than the reservoir pressure, but less than the formation fracture pressure which depends on the strength of the formation. Formation fracture pressure is the pressure above which the injection of fluids will cause the formation to fracture.

In some embodiments, the method may further include preventing precipitation of the asphaltene at an introduction point of the asphaltene composition to the first region 160. For example, in some embodiments, the method may include introducing a spacer fluid into the formation after introducing the asphaltene composition and before introducing the aqueous composition 130. Introducing the spacer fluid into the formation may include injecting the spacer fluid through the diverter injection well 100. The spacer fluid may be used to propel the asphaltene composition farther into the formation. As used in this disclosure, a spacer fluid refers to a liquid used to physically separate one special-purpose liquid from another. In this case, the spacer fluid maybe used to separate the asphaltene composition from the aqueous composition. Using a spacer fluid may ensure that the asphaltene composition does not precipitate at the injection point, or introduction point, of the diverter injection well 100. Special-purpose liquids are typically prone to contamination, so a spacer fluid compatible with each is used between the two. Therefore, the spacer fluid would be compatible with both the asphaltene composition and the aqueous composition. The spacer fluid may be an oil-based fluid, however various spacer fluids are contemplated based on the specific industrial application. Parameters governing the effectiveness of a spacer include flow rate, contact time, and fluid properties.

Once the asphaltene composition is positioned within the first region 160 of the formation, the method may include introducing the aqueous composition 130 into the subterranean formation 190 to precipitate the asphaltene out of the asphaltene composition in the first region 160 to form a barrier 170 between the first region 160 and the second region 180. Introducing the aqueous composition 130 into the formation may include injecting the aqueous composition 130 through the diverter injection well 100. In some embodiments, the aqueous composition 130 may include one or more than one of fresh water, salt water, brine, municipal water, formation water, produced water, well water, filtered water, distilled water, sea water, other type of water, or combinations of waters. In some embodiments, the aqueous composition 130 may include water or a solution containing water and one or more inorganic compounds dissolved in the water or otherwise completely miscible with the water. In some embodiments, the aqueous composition may contain brine, including natural and synthetic brine. Brine includes water and a salt that may include calcium chloride, calcium bromide, sodium chloride, sodium bromide, other salts, and combinations of these.

Referring again to FIG. 1, in some embodiments, the method may include performing EOR in the proximate second region 180. EOR may be performed once the aqueous composition 130 has been introduced into the formation and the asphaltene has precipitated out of the asphaltene composition in the first region 160 and formed a barrier 170 between the first region 160 and the second region 180. In some embodiments, the EOR may include injecting a treatment composition 140 into the first region 160 from an EOR injection well 110. The barrier 170 formed by the asphaltene precipitate from the asphaltene composition may maintain at least a portion of the treatment composition 140 in the second region 180. The barrier 170 may, therefore, restrict the flow of the treatment composition 140 into other regions of the subterranean formation. By restricting the flow of the treatment composition 140, the barrier 170 may increase the quantity of treatment composition 140 that enters the second region 180, which may result in increasing the quantity of hydrocarbons 150 that are produced from the second region 180 in production well 120.

In another embodiment, the method may further include removing the barrier 170 from the first region 160 by introducing the solvent composition to the first region 160. The solvent composition may displace the aqueous composition 130 in the first region 160. By displacing the aqueous composition 130, the solvent composition increases the solubility of the precipitated asphaltene and dissolves the precipitated asphaltene back into solution, forming the barrier 170. This asphaltene composition may then be conveyed from the first region 160 to the surface, due to its lesser viscosity, which may result in removing the asphaltene composition from the subterranean formation 190.

Figure 4:
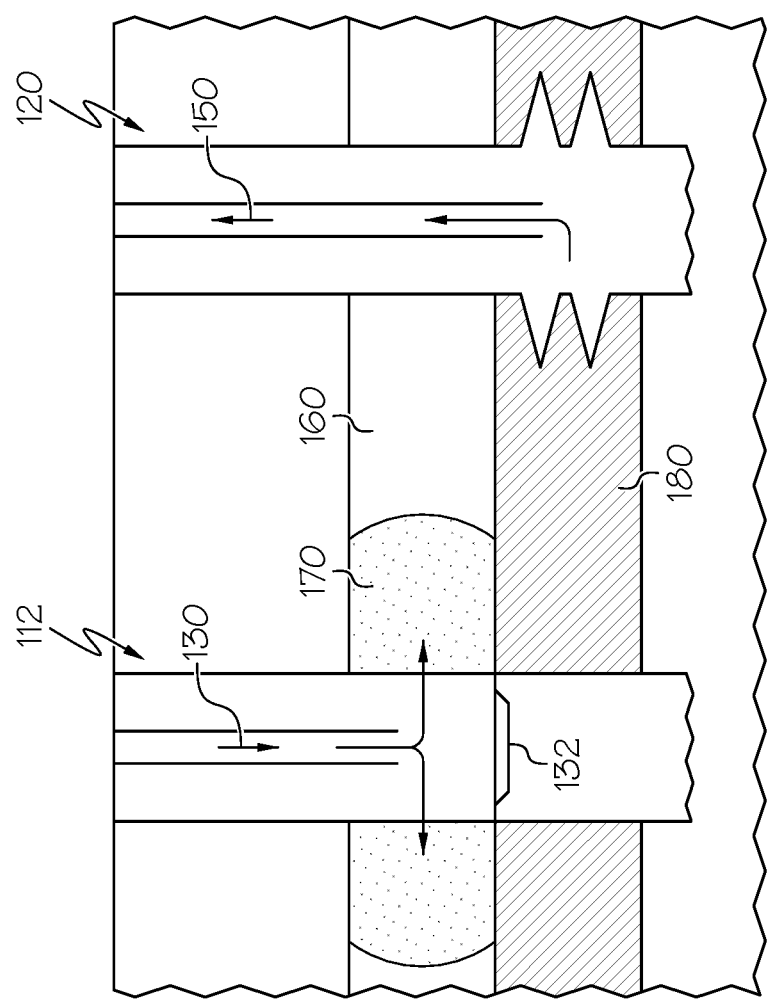
FIG. 4 schematically depicts a formation of a barrier for diversion of treatment materials in a subterranean formation, according to one or more embodiments described in this disclosure.

Referring now to FIG. 4, in some embodiments, the first region 160 may be located vertically above the second region 180, as discussed previously. In this embodiment, the method may include introducing the asphaltene composition into the first region 160 through an injection well 112, while production well 120 produces hydrocarbons 150 from the second region 180. During the introduction of the asphaltene composition, the injection well 112 may be mechanically isolated from the second region 180 using a packer 132 or any other known isolation method. The method may further include introducing the aqueous composition 130 into the first region 160 through the injection well 112 to precipitate the asphaltene out of the asphaltene composition in the first region 160 to form a barrier 170 between the first region 160 and the second region 180.

Figure 5:
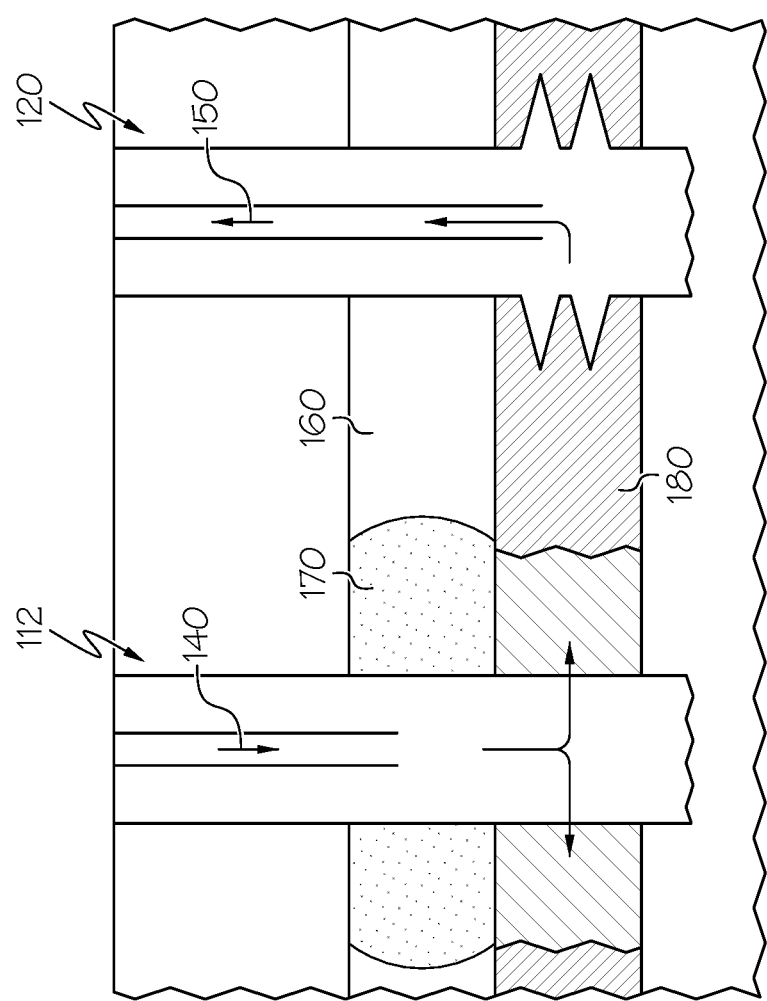
FIG. 5 schematically depicts a barrier for diversion of treatment materials in a subterranean formation, according to one or more embodiments described in this disclosure.

Referring to FIG. 5, the method may further include performing EOR in the proximate second region 180 by introducing the treatment composition 140 into the second region 180 through the injection well 112 after the packer 132 (FIG. 4) has been removed. The barrier 170 formed by the asphaltene precipitate from the asphaltene composition may maintain at least a portion of the treatment composition 140 in the second region 180. The barrier 170 may, therefore, restrict the flow of the treatment composition 140 into other regions of the subterranean formation. By restricting the flow of the treatment composition 140, the barrier 170 may increase the quantity of treatment composition 140 that enters the second region 180, which may result in increasing the quantity of hydrocarbons 150 that are produced from the second region 180 in production well 120. Although the first region 160 is depicted in FIGS. 4 and 5 as being located vertically above the second region 180, it is understood that, in some embodiments, the first region 160 may also be located vertically below the second region 180.

EXAMPLES

The following examples illustrate features of the present disclosure but are not intended to limit the scope of the disclosure.

Example 1

To evaluate the effect of water on the asphaltene composition, varying amounts of asphaltene composition and water were mixed together and the viscosity was measured using an Anton Paar viscometer at room temperature and atmospheric pressure at shear rates of from 0.1 per second ($s^{-1}$) to 1,000 $s^{-1}$. The viscosities of the asphaltene compositions are reported in millipascal seconds (mPa·s). The asphaltene composition had a weight ratio of solvent to asphaltene of 10:1. The solvent included 15 wt. % methanol, 10 wt. % xylene, 10 wt. % toluene, and 65 wt. % chloroform.

TABLE 1

Viscosity measurements of asphaltene composition and water mixtures at increasing shear rates.

| Shear Rate [$s^{-1}$] | Asphaltene Composition (201) Viscosity [mPa · s] | 20 ml Asphaltene Composition 5 ml Water (202) Viscosity [mPa · s] | 15 ml Asphaltene Composition 10 ml Water (203) Viscosity [mPa · s] | 10 ml Asphaltene Composition 15 ml Water (204) Viscosity [mPa · s] | 5 ml Asphaltene Composition 20 ml Water (205) Viscosity [mPa ·s] |
|---|---|---|---|---|---|
| 0.1 | 2,720 | 747 | 1,710 | 3,170 | 1,890 |
| 0.147 | 2,060 | 747 | 1,700 | 2,940 | 1,800 |
| 0.215 | 1,670 | 748 | 1,410 | 2,670 | 1,580 |
| 0.316 | 1,240 | 749 | 1,200 | 2,510 | 1,150 |
| 0.464 | 1,040 | 747 | 1,080 | 2,290 | 936 |
| 0.681 | 910 | 747 | 1,020 | 2,080 | 739 |
| 1 | 829 | 745 | 977 | 2,010 | 536 |
| 1.47 | 771 | 745 | 939 | 1,790 | 389 |
| 2.15 | 736 | 743 | 859 | 1,580 | 260 |
| 3.16 | 710 | 739 | 817 | 1,430 | 171 |
| 4.64 | 696 | 736 | 805 | 1,340 | 80.1 |
| 6.81 | 685 | 733 | 792 | 1,260 | 119 |
| 10 | 676 | 730 | 782 | 1,250 | 79.7 |
| 14.7 | 670 | 729 | 775 | 1,210 | 62.2 |
| 21.5 | 664 | 728 | 770 | 1,200 | 19.4 |
| 31.6 | 661 | 726 | 766 | 1,140 | 7.88 |
| 46.4 | 657 | 725 | 763 | 1,130 | 10.3 |
| 68.1 | 652 | 726 | 766 | 1,110 | 12.4 |
| 100 | 647 | 728 | 774 | 1,020 | 5.23 |
| 147 | 638 | 723 | 784 | 915 | 4.91 |
| 215 | 629 | 716 | 786 | 562 | 5.16 |
| 316 | 622 | 705 | 784 | 362 | 5.44 |
| 464 | 617 | 699 | 778 | 280 | 7.26 |
| 681 | 608 | 690 | 767 | 221 | 8.94 |
| 1,000 | 587 | 695 | 739 | 134 | 8.67 |

Figure 2:
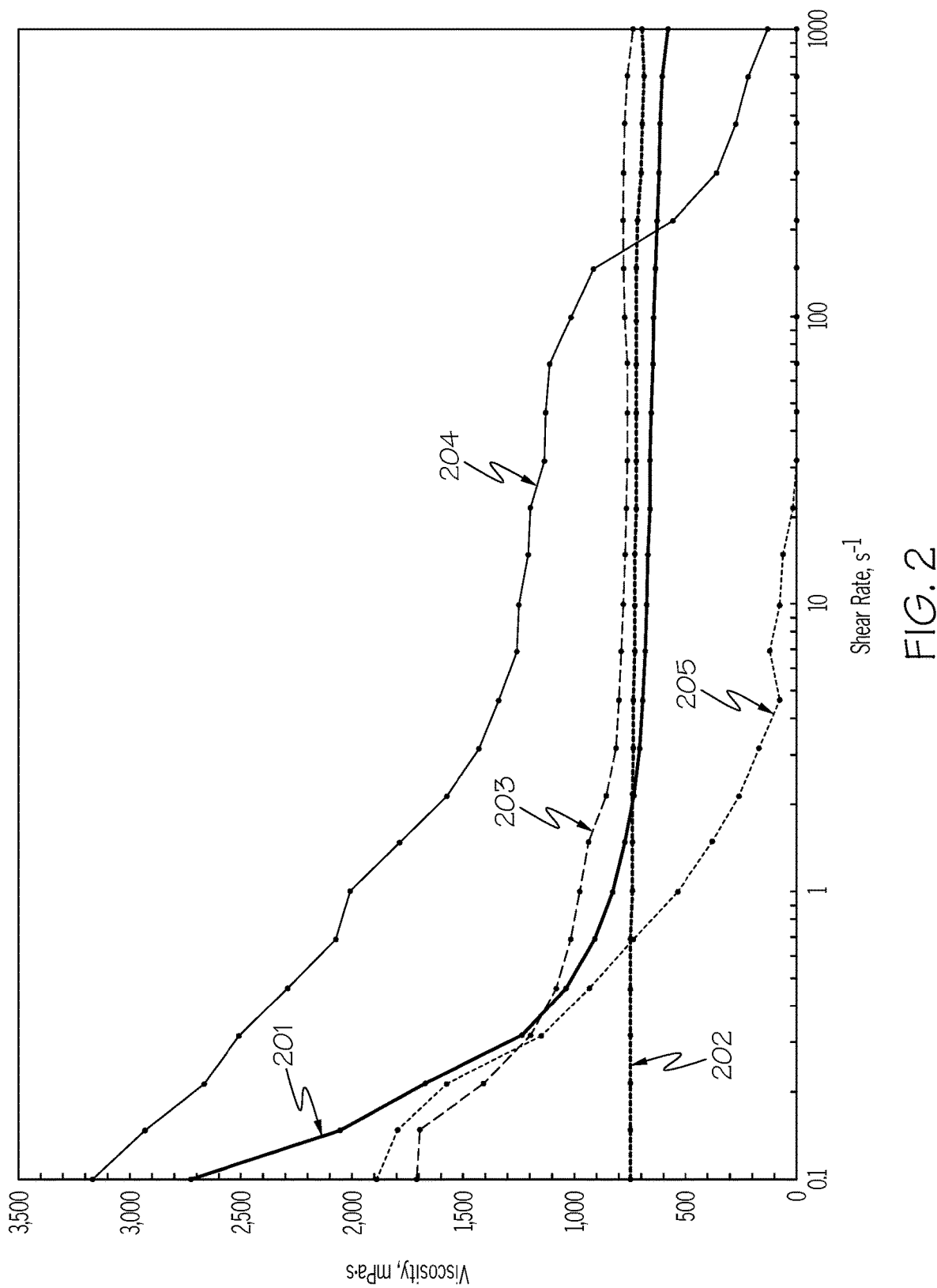
FIG. 2 graphically depicts the relationship between viscosity (y-axis) and shear rate (x-axis) for various concentrations of asphaltene dissolved in a solvent, according to one or more embodiments described in this disclosure.

Referring to FIG. 2, increasing the proportion of water in the mixture increased the viscosity of the mixture. More specifically, mixture 202, which included 20 ml asphaltene composition and 5 ml water, had viscosity less than the viscosity of mixture 203. Mixture 203 included 15 ml asphaltene composition and 10 ml water. Likewise, mixture 203 had a viscosity less than the viscosity of mixture 204, except at shear rates greater than 150 $s^{-1}$. Mixture 204 included 10 ml asphaltene composition and 15 ml water. Mixture 205, which included 5 ml asphaltene composition and 20 ml water, did not follow this trend. However, it was observed that the ratio of water to asphaltene composition in mixture 205 was great enough to cause the asphaltene to precipitate out of the solution and coat the viscometer. Thus, the viscosity measured for mixture 205 was considerably less than the other mixtures and approximated the viscosity of a mixture of water and solvent. The viscosity of mixture 201, which included only the asphaltene composition, ranged from 2720 mPa·s at 0.1 $s^{-1}$ to 587 mPa·s at 1000 $s^{-1}$. The viscosity of mixture 202 ranged from 747 mPa·s at 0.1 $s^{-1}$ to 695 mPa·s at 1000 $s^{-1}$. The viscosity of mixture 203 ranged from 1710 mPa·s at 0.1 $s^{-1}$ to 739 mPa·s at 1000 $s^{-1}$. The viscosity of mixture 204 ranged from 3170 mPa·s at 0.1 $s^{-1}$ to 134 mPa·s at 1000 $s^{-1}$. The viscosity of mixture 205 ranged from 1890 mPa·s at 0.1 $s^{-1}$ to 8.67 mPa·s at 1000 $s^{-1}$. At a shear rate of 10 $s^{-1}$, the viscosity increases from mixture 201, to mixture 202, to mixture 203, to mixture 204. Not intending to be bound by theory, it is believed that this increasing of viscosity with increasing water content was caused by increasing precipitation of the asphaltene in the mixtures due to the decreasing solubility of the asphaltene with increasing water content.

Example 2

Example 2 demonstrates the asphaltene precipitating out of the asphaltene composition when the asphaltene composition is diluted with water. 50 g of solid asphaltene were dissolved in 1000 ml of solvent to form the asphaltene composition. The solvent included 15 wt. % methanol, 10 wt. % xylene, 10 wt. % toluene, and 65 wt. % chloroform. Then, 2000 ml water was added to the asphaltene composition. The asphaltene precipitated out of the solution formed by water mixed with the asphaltene composition to form a solid asphaltene precipitate. After decanting the liquids, some of the solid asphaltene precipitate coated the inside of the testing container. The solid asphaltene precipitate was then recovered from the testing container. 60 to 65 wt. % of the initial solid asphaltene was recovered as solid asphaltene precipitate, or 30 to 32.5 g of the initial 50 g of asphaltene added to the asphaltene composition of Example 2.

Example 3

Figure 3:
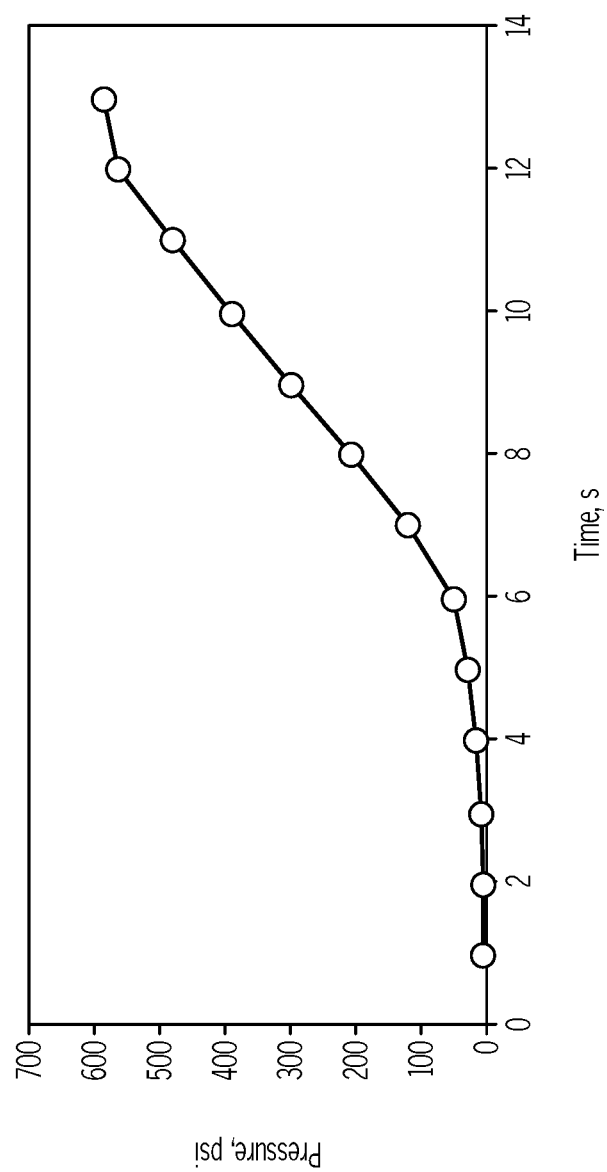
FIG. 3 graphically depicts the pressure (y-axis) as a function of time (x-axis) during flood testing of a core plug sample injected with an asphaltene composition, according to one or more embodiments described in this disclosure.

To investigate how the asphaltene precipitate functions as a barrier for use in diversion, the asphaltene composition was injected into a core sample and flooded with water. A Coretest system model RPS-812-Z was used in this experiment. The asphaltene composition had a weight ratio of solvent to asphaltene of 10:1. The solvent included 15% methanol, 10% xylene, 10% toluene, and 65% chloroform. A core plug sample with a permeability of 308 milliDarcys (mD) was selected. The core plug sample was placed in a core flood system and injected with the asphaltene composition at 120° C., 500 psi back pressure, and 1000 psi confined pressure. Back pressure is the pressure within a system caused by fluid friction or an induced resistance to flow through the system. Most process facilities require a minimum system pressure to operate efficiently. The backpressure was created and controlled by a valve set to operate under the desired range of conditions. Confined pressure is the pressure under which the core plug sample is confined. The core plug sample was then injected with water to flood the pores. FIG. 3 shows the pore pressure of the core plug sample throughout the flood test. FIG. 3 illustrates that the pore pressure of the core plug sample rose from 5.9 psi at 1 second during the flood test to 585.2 psi at 13 seconds (40.68 kilopascals (kPa) at 1 second to 4035 kPa at 13 seconds; where 1 psi=6.894757 kPa), which indicates that the permeability of the core sample decreased when the asphaltene precipitated out of solution during the water flood. The increase in the pressure during the flood test indicates that the solid asphaltene precipitated within the pores of the core plug sample to produce a restriction to flow of fluids through the core plug.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A method for isolating a first region and a proximate second region of a subterranean formation, the method comprising:
   introducing an asphaltene composition into the first region of the subterranean formation, the asphaltene composition comprising asphaltene dissolved in a solvent, the solvent comprising an alkyl alcohol, an alkyl aromatic, and 40 to 85 wt. % chloroform based on a total weight of the solvent, in which:
      the asphaltene composition has a weight ratio of solvent to asphaltene from 5:1 to 20:1, and
      the solvent comprises from 5 to 50 wt. % alkyl aromatic based on a total weight of the solvent; and
   after introducing the asphaltene composition, introducing an aqueous composition to the first region in order to precipitate the asphaltene in the first region, where the precipitated asphaltene forms a barrier that isolates the second region from at least a portion of the first region.

2. The method of claim 1 in which the asphaltene composition has a viscosity of from 1 centipoise (cP) to 3500 cP.

3. The method of claim 1 in which an inlet pressure of the asphaltene composition during introduction of the asphaltene composition to the first region is from 2000 to 4000 pounds per square inch (psi).

4. The method of claim 1 in which the solvent comprises methanol, toluene, xylene, and the chloroform.

5. The method of claim 1 in which the solvent comprises:
5 to 50 wt. % methanol;
5 to 50 wt. % xylene; and
5 to 50 wt. % toluene based on a total weight of the solvent.

6. The method of claim 1 in which the aqueous composition is chosen from the group consisting of fresh water, salt water, brine, municipal water, formation water, produced water, well water, filtered water, distilled water, sea water, or combinations of these.

7. The method of claim 1 in which the asphaltene composition is substantially free of undissolved solids prior to introducing the asphaltene composition to the first region.

8. The method of claim 1 in which the asphaltene composition is a stable solution at a pressure of up to 4000 psi and a temperature up to 200° C.

9. The method of claim 1 further comprising injecting a spacer fluid after introducing the asphaltene composition and before introducing the aqueous composition.

10. The method of claim 1 further comprising preventing precipitation of the asphaltene at an introduction point of the asphaltene composition to the first region.

11. The method of claim 1 in which introducing the asphaltene composition to the first region comprises injecting the asphaltene composition from an injection well into the first region.

12. The method of claim 1 comprising introducing the asphaltene composition to the first region using coiled tubing or a drill string.

13. The method of claim 1 further comprising conducting EOR in the second region that is isolated from at least a portion of the first region by the barrier.

14. The method of claim 13 in which the EOR comprises:
injecting a treatment composition into the first region from an injection well, where the barrier maintains the treatment composition in the second region and restricts flow of the treatment composition into other regions of the subterranean formation; and
recovering hydrocarbons from the second region.

15. The method of claim 1 further comprising removing the barrier by introducing a solvent composition to the first region, in which the solvent composition displaces the aqueous composition in the first region, thereby increasing the solubility of the asphaltene and dissolving the precipitated asphaltene.

* * * * *